United States Patent
MacCallum

(10) Patent No.: US 11,753,136 B2
(45) Date of Patent: Sep. 12, 2023

(54) AEROSPACE BALLOON SYSTEM AND METHOD OF OPERATION

(71) Applicant: Space Perspective Inc., Kennedy Space Center, FL (US)

(72) Inventor: Taber MacCallum, Titusville, FL (US)

(73) Assignee: Space Perspective Inc., Kennedy Space Center, FL (US)

( * ) Notice: Subject to any disclaimer, the term of this patent is extended or adjusted under 35 U.S.C. 154(b) by 0 days.

(21) Appl. No.: 18/084,410

(22) Filed: Dec. 19, 2022

(65) Prior Publication Data

US 2023/0132269 A1     Apr. 27, 2023

Related U.S. Application Data

(63) Continuation of application No. 17/356,328, filed on Jun. 23, 2021, now Pat. No. 11,560,210, which is a continuation of application No. 17/164,668, filed on Feb. 1, 2021, now Pat. No. 11,072,410.

(60) Provisional application No. 62/969,447, filed on Feb. 3, 2020.

(51) Int. Cl.

| B64B 1/44 | (2006.01) |
|---|---|
| B64B 1/40 | (2006.01) |
| B64D 1/12 | (2006.01) |
| B64D 17/18 | (2006.01) |
| B64D 11/00 | (2006.01) |
| B64B 1/64 | (2006.01) |

(52) U.S. Cl.
CPC ............... *B64B 1/44* (2013.01); *B64B 1/40* (2013.01); *B64B 1/64* (2013.01); *B64D 1/12* (2013.01); *B64D 11/00* (2013.01); *B64D 17/18* (2013.01); *B64D 2011/0061* (2013.01)

(58) Field of Classification Search
CPC ................ B64B 1/44; B64B 1/46; B64B 1/48
See application file for complete search history.

(56) References Cited

U.S. PATENT DOCUMENTS

| 2,900,147 | A | 8/1959 | Huch et al. | |
|---|---|---|---|---|
| 3,041,019 | A | 6/1962 | Froehlich | |
| 3,090,585 | A | 5/1963 | Church | |
| 6,234,425 | B1 | 5/2001 | Rand et al. | |
| 6,830,222 | B1 | 12/2004 | Nock et al. | |
| 9,242,712 | B1 | 1/2016 | Ratner | |
| 9,540,091 | B1 * | 1/2017 | MacCallum | B64B 1/70 |
| 9,694,910 | B2 | 7/2017 | MacCallum et al. | |
| 2006/0000945 | A1 * | 1/2006 | Voss | B64B 1/60 244/97 |
| 2016/0264248 | A1 | 9/2016 | MacCallum et al. | |
| 2017/0129579 | A1 * | 5/2017 | de Jong | B64B 1/44 |
| 2017/0297724 | A1 * | 10/2017 | Leidich | B64D 17/025 |
| 2017/0331177 | A1 * | 11/2017 | MacCallum | B64B 1/40 |
| 2017/0349291 | A1 | 12/2017 | MacCallum et al. | |

* cited by examiner

*Primary Examiner* — Justin M Benedik
(74) *Attorney, Agent, or Firm* — Jeffrey Schox

(57) ABSTRACT

A balloon system including a balloon, and optionally including a payload and/or a safety module. A balloon, preferably including a balloon envelope and one or more passive vents, and optionally including one or more active valves. A method of balloon system operation, preferably including maintaining a zero-pressure balloon condition and sealing balloon vents, and optionally including ascending, descending, and/or otherwise operating the balloon system in flight.

22 Claims, 8 Drawing Sheets

AEROSPACE BALLOON SYSTEM AND METHOD OF OPERATION

CROSS-REFERENCE TO RELATED APPLICATIONS

This application is a continuation of U.S. patent application Ser. No. 17/356,328, filed 23 Jun. 2021, which is a continuation of U.S. patent application Ser. No. 17/164,668, filed 1 Feb. 2021, which claims the benefit of U.S. Provisional Application Ser. No. 62/969,447, filed 3 Feb. 2020, each of which is incorporated in its entirety by this reference.

TECHNICAL FIELD

This invention relates generally to the aerospace vehicle field, and more specifically to a new and useful aerospace balloon system and method of operation.

BACKGROUND

High-altitude zero-pressure balloons are typically vented to maintain a zero-pressure state within the balloon. However, such venting is typically achieved via passive vents that fluidly couple the balloon interior with the surrounding atmosphere. Thus, there is a need in the aerospace vehicle field to create a new and useful aerospace balloon system and method of operation.

BRIEF DESCRIPTION OF THE FIGS.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1A:
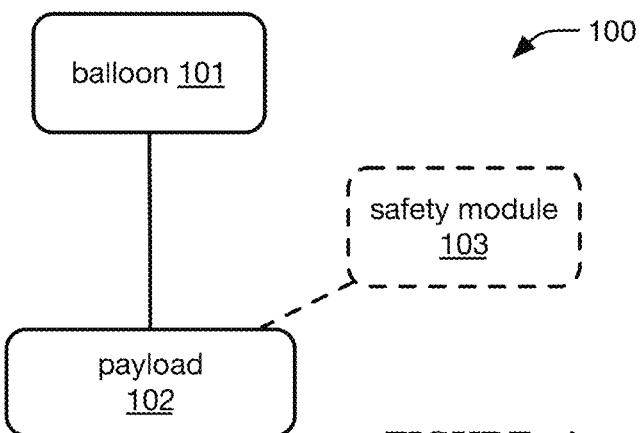
FIG. 1A is a schematic representation of an embodiment of a balloon system.
Figure 1B:
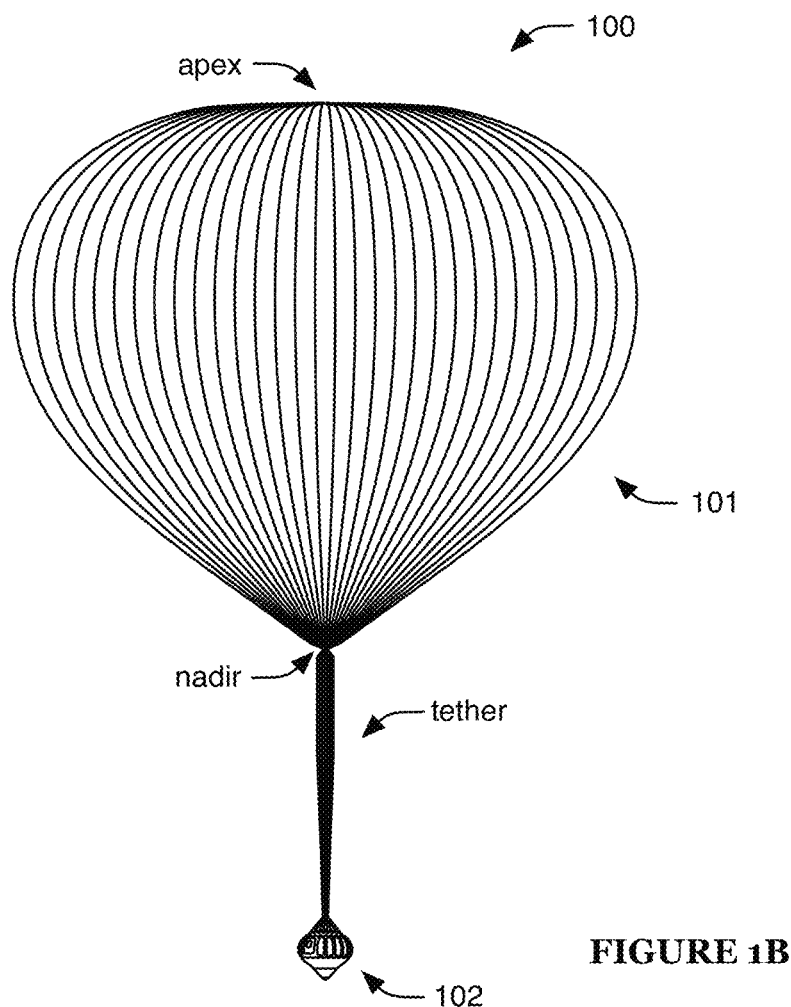
FIG. 1B is a side view of an example of the balloon system in a fully-inflated state.
Figure 8:
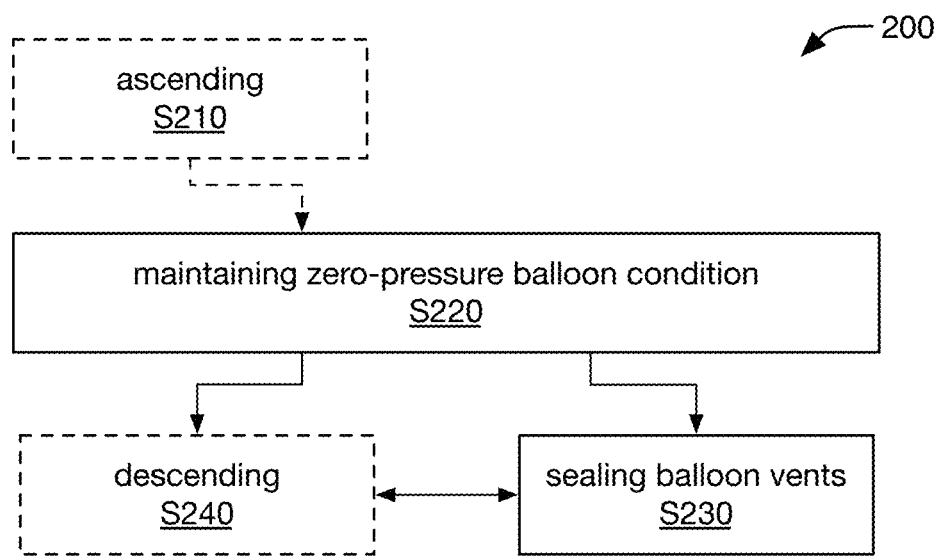
FIG. 8 is a schematic representation of an embodiment of a method of balloon system operation.
Figure 9:
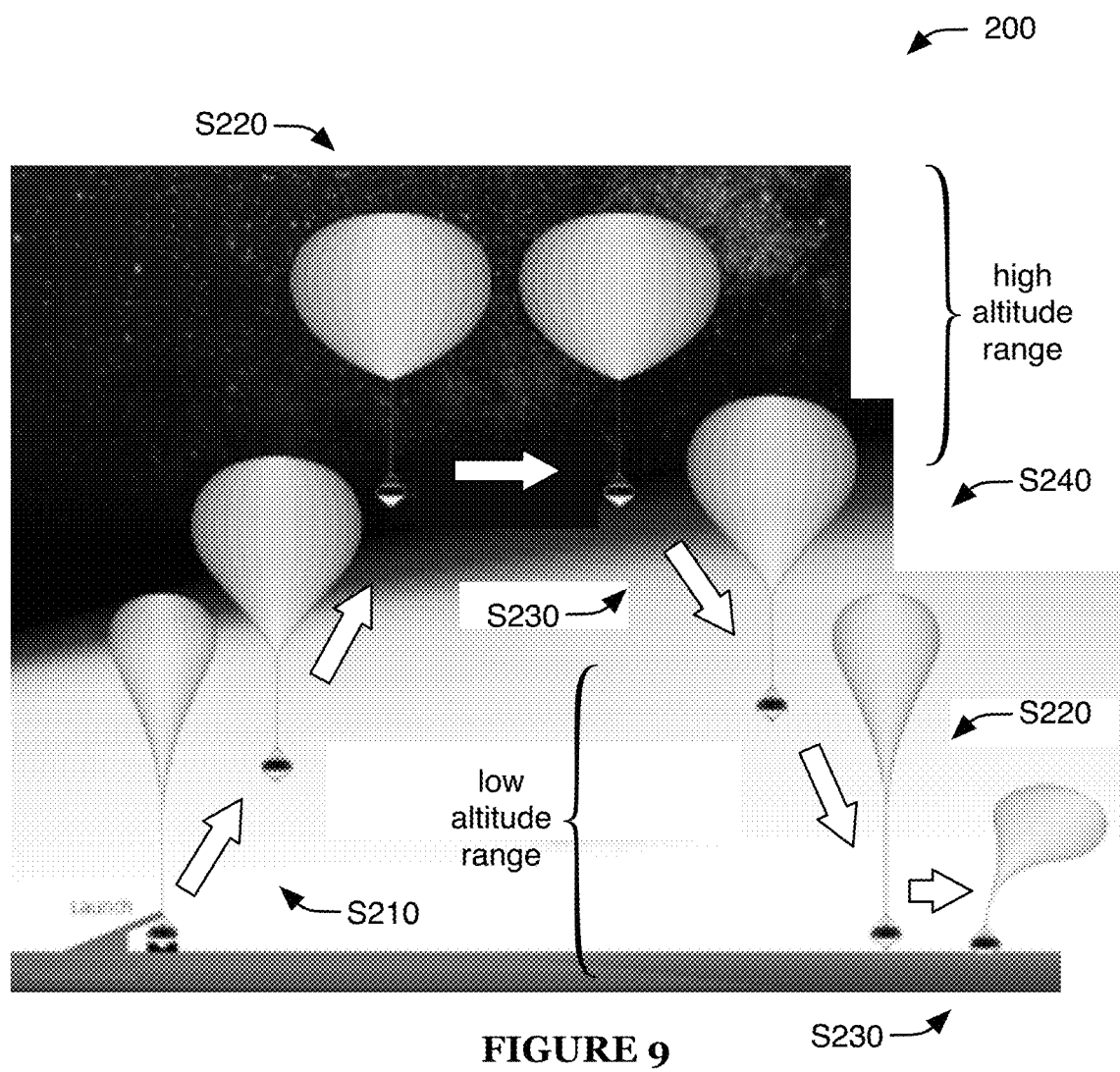
FIG. 9 is a schematic representation of an example of the method.

A balloon system loo preferably includes a balloon 101, and can optionally include a payload 102 and/or a safety module 103 (e.g., as shown in FIGS. 1A-1B). However, the balloon system 100 can additionally or alternatively include any other suitable elements in any suitable arrangement. A method 200 of balloon system operation preferably includes maintaining a zero-pressure balloon condition S220 and sealing balloon vents S230 (e.g., as shown in FIGS. 8-9). The method 200 can optionally include ascending S210, descending S240, and/or otherwise operating the balloon system in flight. However, the method 200 can additionally or alternatively include any other suitable elements performed in any suitable manner.

2. Benefits.

Embodiments of the balloon system 100 and/or method 200 can confer one or more benefits. In some embodiments, the system and/or method can allow venting of lift gas from zero-pressure balloons at high altitudes, preferably while also preventing ingress of atmospheric gasses into such balloons at lower altitudes (e.g., during descent from and/or ascent to higher altitudes, etc.). Thus, such embodiments can enable safe flight operation of a zero-pressure balloon (possibly a hydrogen-inflated balloon, but additionally or alternatively a balloon inflated with any other suitable lift gas), including descent from high altitudes (e.g., stratospheric altitudes) into lower altitudes (e.g., tropospheric altitudes), while reducing or eliminating risks associated with such a descent (e.g., explosion risks arising from mixing hydrogen with ingested air, buoyancy-loss risks arising from displacement of lift gas by ingested air, etc.). In contrast, typical aerospace balloon systems are not designed to descend with an inflated balloon, but rather will deflate the balloon and/or detach the payload from the balloon before or during a payload descent (typically, in order to initiate the descent); accordingly, such systems would typically face these risks if used to descend while attached to an inflated balloon. However, the system and/or method can additionally or alternatively confer any other suitable benefits.

3. Balloon System.

The balloon system 100 is preferably a balloon-based aerospace vehicle (e.g., balloon-propelled space capsule), such as a balloon-propelled vehicle configured to operate in the troposphere, stratosphere, and/or any other suitable atmospheric layers. However, the system can additionally or alternatively be any other suitable lighter-than-air vehicle or aerostat (e.g., airship), space vehicle (e.g., spacecraft and/or space capsule), aerodyne (e.g., fixed- and/or rotary-wing aircraft), and/or any other suitable aerospace vehicle. In alternate embodiments, the system can additionally or alternatively function as a terrestrial vehicle, a watercraft, and/or any other suitable vehicle.

The system 100 can optionally include one or more elements such as described in U.S. Provisional Patent Application 62/969,447, filed 3 Feb. 2020 and titled "Space Capsule", which is herein incorporated in its entirety by this reference. In examples, the balloon 101 can include one or more elements described in U.S. Provisional Patent Application 62/969,447 regarding the 'Balloon System', the payload 102 can include one or more elements described in U.S.

Provisional Patent Application 62/969,447 regarding the 'Capsule System' and/or 'Avionics and Power', and/or the safety module 103 can include one or more elements described in U.S. Provisional Patent Application 62/969,447 regarding the 'Backup Descent System'. However, the system 100 can additionally or alternatively include any other suitable elements described in U.S. Provisional Patent Application 62/969,447.

3.1 Balloon.

The balloon 101 preferably includes an envelope 110 and one or more passive vents 140, and can optionally include one or more active valves 150, reefing sleeves, and/or any other suitable elements (e.g., as shown in FIGS. iD, 2A-2B, 3A-3B, and/or 4A-4C). The balloon 101 preferably defines an apex and a nadir. When the balloon is inflated and in flight, the apex is arranged at (or substantially at) the top of the balloon (e.g., with respect to a gravity vector), and the nadir is arranged at (or substantially at) the bottom of the balloon (e.g., opposing the apex across the balloon along or substantially along the gravity vector).

The balloon is preferably a zero-pressure balloon (e.g., configured to maintain a substantially zero-pressure configuration, in which the balloon interior is at substantially the same pressure as the atmosphere surrounding the balloon, while fully and/or substantially-fully inflated; configured not to maintain a substantially greater pressure within the balloon than in the surrounding atmosphere; etc.). However, the balloon can alternatively be a super-pressure balloon or any other suitable type of balloon.

In some embodiments, the balloon 101 (and/or elements thereof, such as the envelope no) can include one or more elements such as described in U.S. patent application Ser. No. 17/162,151, filed 29 Jan. 2021 and titled "Aerospace Balloon System and Method of Operation", which is incorporated in its entirety by this reference (e.g., as described in U.S. patent application Ser. No. 17/162,151 regarding the 'balloon 101' and/or the 'envelope no'). For example, the balloon 101 can optionally include an apex fitting and/or nadir fitting such as described in U.S. patent application Ser. No. 17/162,151, and/or the envelope 110 can include one or more gores, load members, and/or reinforcement elements such as described in U.S. patent application Ser. No. 17/162, 151.

3.1.1 Envelope.

The envelope 110 preferably functions to contain a lighter-than-air fluid (e.g., lift gas, such as helium, molecular hydrogen, etc., and/or mixtures thereof). In some embodiments, the lighter-than-air fluid is a flammable fluid, preferably hydrogen gas (or a mixture containing hydrogen gas). However, the lighter-than-air fluid can additionally or alternatively include any other suitable species. The envelope preferably contains enough fluid to fully or substantially fully inflate the balloon while it is operating at or near the maximum altitude of a flight, more preferably containing an excess of such fluid during ascent (wherein this excess fluid can be referred to as 'free lift'). Further, the envelope 110 preferably functions to isolate this lighter-than-air fluid from the surrounding atmosphere (e.g., preventing mixing of oxygen-containing air with the fluid contained within the envelope).

The balloon will typically be partially deflated at lower altitudes, due to the significantly increased atmospheric pressure at lower altitudes. For example, a zero-pressure balloon (e.g., in which the lighter-than-air fluid is at substantially the same pressure as the atmosphere surrounding the balloon) will typically not contain much more fluid than sufficient to be fully inflated (while in the zero-pressure condition) at a maximum intended altitude, and thus will be only partially inflated at lower altitudes, at which the higher atmospheric pressure compresses that same quantity of fluid into a smaller volume (e.g., defining a volume ratio between the partially- and fully-inflated balloon of less than 1%, 2%, 3%, 5%, 10%, 15%, 20%, 30%, 0.1-1%, 1-2%, 2-5%, 5-10%, 10-20%, 20-30%, 30-50%, or greater than 50%).

3.1.2 Passive Vent.

The balloon 101 preferably includes one or more passive vents 140. At high altitudes (e.g., when the balloon is in the high-altitude range, such as described below), the passive vents preferably function to fluidly couple the balloon interior to the atmosphere, thereby enabling passive maintenance of a zero-pressure condition within the balloon via passive venting of lift gas. At lower altitudes, the passive vents are preferably sealed to prevent ingress of atmospheric gases (e.g., oxygen) into the balloon interior. In examples, the passive vents can include one or more elements such as described in U.S. Provisional Patent Application 62/969, 447, filed 3 Feb. 2020 and titled "Space Capsule", which is herein incorporated in its entirety by this reference (e.g., as described in U.S. Provisional Patent Application 62/969,447 regarding the 'Closable balloon vent ducts' and/or the 'Closable zero pressure balloon ducts').

The passive vents 140 are preferably operable in two configurations. In the first configuration, the balloon interior is fluidly coupled to the balloon exterior (e.g., to the atmosphere) via the passive vent (e.g., as shown in FIGS. 4A-4B, 5A, 5C, 6A, and/or 7A). In this configuration, the vent preferably defines an aperture in the balloon wherein lift gas can passively vent through the aperture. In the second configuration, the balloon interior is preferably not fluidly coupled to the balloon exterior via the passive vent (e.g., as shown in FIGS. 4C, 5B, 5D, 6B, and/or 7B). In this configuration, the aperture in the balloon is preferably closed and/or sealed such that atmospheric gas cannot enter the balloon through the aperture. The passive vent is preferably operable to transition from the first configuration to the second configuration, and can optionally be operable to transition from the second configuration to the first configuration, to repeatedly transition between the configurations, to transition into any other suitable configurations, and/or be configured in any other suitable manner. In other embodiments, each passive vent may be operable to transition once (and only once) from the first configuration to the second configuration and may not be operable to transition back to the first configuration. However, the passive vents can additionally or alternatively have any other suitable functionalities.

In a first embodiment, the passive vent includes a duct structure. In this embodiment, the vent defines an aperture 141 in the balloon envelope, and the aperture is connected to an extended duct that (e.g., in the first configuration) vents to atmosphere. In this embodiment, the duct runs from a balloon end 142 (connected to the aperture) to an external end 143 which vents to the atmosphere. The duct can be attached to the balloon along all or part of its length (e.g., at or near the external end, at or near the balloon end, at any suitable location between the ends, etc.), such as shown by way of example in FIG. 2A, and/or can hang freely down from the balloon, such as shown by way of example in FIGS. 2B and/or 3A-3B.

In a second embodiment, the vent is a simple opening. In this embodiment, an aperture 141 (e.g., slit, hole, etc.) defined in the balloon envelope forms the vent. For example, the vent can define a hole in the bottom of the balloon. In this embodiment, in the first configuration, the aperture is open and leads directly between the balloon interior and exterior (e.g., atmosphere).

In a third embodiment, the vent includes a skirt structure. In this embodiment, the balloon narrows to an aperture 141 (e.g., at or near the balloon nadir), then opens up again past that aperture, thereby defining a skirt structure opposing the balloon envelope across the aperture (e.g., below the aperture, such as shown by way of example in FIGS. 4A-4C). The skirt 144 can be of unitary construction with the balloon envelope (e.g., formed by a continuation along the length of the gores and load members), or can be of separate construction from the envelope (e.g., attached to the envelope, such as at or near the aperture, and preferably forming a seal with the envelope). However, the passive vent can additionally or alternatively include any other suitable vent structures.

The passive vent preferably includes one or more closure mechanisms 145. The closure mechanism preferably functions (e.g., in the second configuration) to seal the vent (e.g., preventing fluid exchange between the balloon interior and the atmosphere). The closure mechanism can be arranged at or near (e.g., configured to close and/or seal at or near) the aperture 141, a location outside the balloon past the aperture, such as the duct (e.g., at or near the external end 143, between the duct ends, etc.), the skirt 144, and/or any other suitable structure, but can additionally or alternatively have any other suitable arrangement.

In a first embodiment, the closure mechanism includes one or more drawstrings (e.g., as shown in FIGS. 4A-4C and 5A-5D). The drawstring can encircle an element to be closed, and an actuator can be operable to tighten the drawstring, thereby sealing the vent at the encircled element and transitioning the system from the first configuration to the second configuration.

In a second embodiment, the closure mechanism can include magnetic elements. The magnets are preferably arranged on separate elements at or near the location to be sealed (e.g., as shown in FIGS. 6A-6B and 7A-7B). The magnets can include permanent magnets, electromagnets, and/or any other suitable magnets. In the first configuration, the magnets remain apart from each other (e.g., are held apart from each other), and the passive vent remains open. In the second configuration, the magnets are allowed to come close to each other, such that the attractive magnetic force between them causes them to remain close (and/or come closer) and holds them together, thereby sealing the vent. In a first example, an actuator brings the magnets close enough to produce a sufficient attractive force between the magnets that they seal the vent. In a second example, an element holding the magnets apart is removed or otherwise ceases to hold the magnets apart, and the magnets are already in close enough proximity that in the absence of the element holding them apart, they are strongly attracted to each other and are brought together, sealing the vent. Additionally or alternatively, in examples including one or more electromagnets, the electromagnets (or a subset thereof) can be deactivated in the first configuration, and can be energized (e.g., magnetized) in the second configuration, thus giving rise to an attractive magnetic force that closes the vent. However, the magnetic closure mechanism can additionally or alternatively operate in any other suitable manner.

Figure 6A:
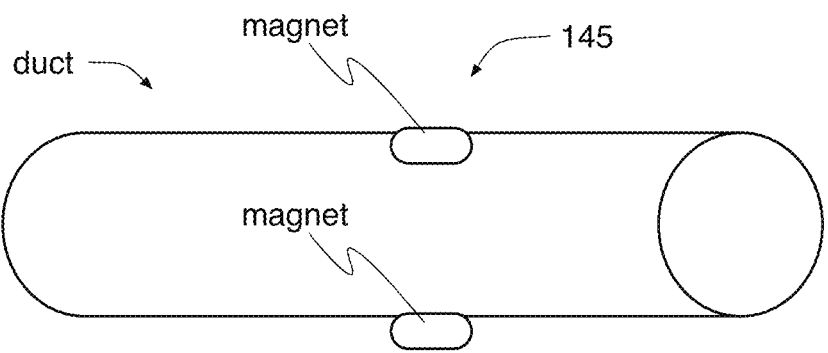
FIGS. 6A-6B are schematic representations of a third example of the closure mechanism in the first configuration and the second configuration, respectively.
Figure 6B:
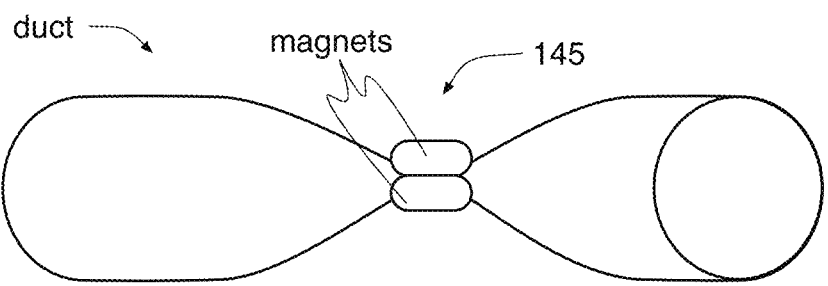
Figure 7A:
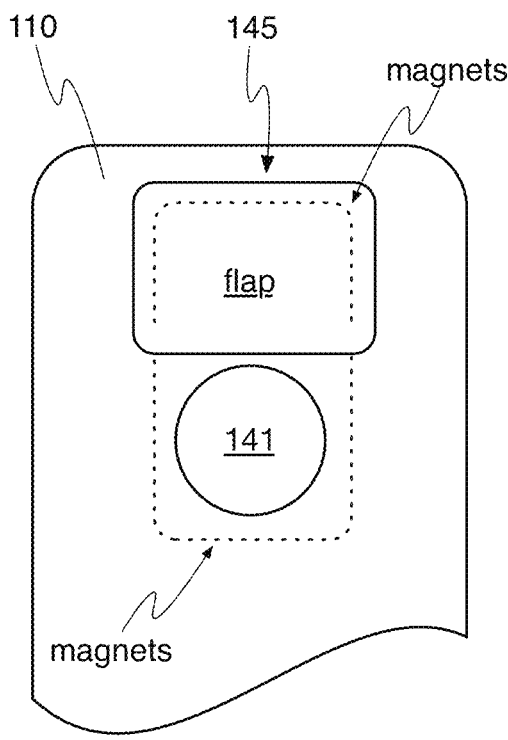
FIGS. 7A-7B are schematic representations a fourth example of the closure mechanism in the first configuration and the second configuration, respectively.
Figure 7B:
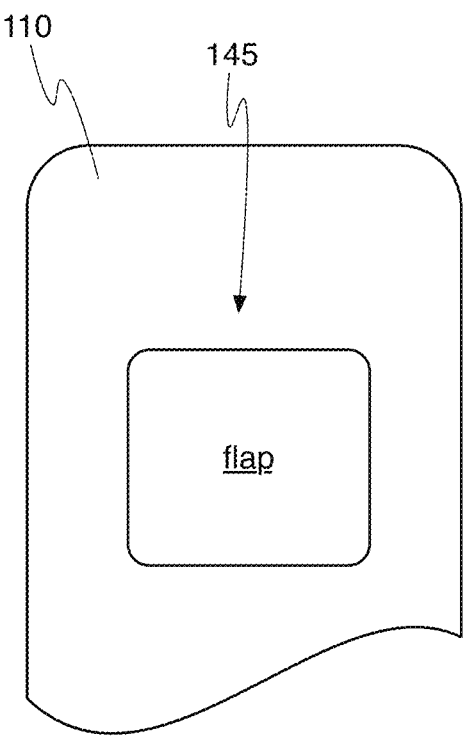

In a first example, the elements in or on which the magnets are arranged can be opposing sides of a duct, skirt, aperture, or other fluid passage (e.g., wherein bringing the magnets together causes the fluid passage to collapse, thereby preventing fluid flow, such as shown by way of example in FIGS. 6A-6B). In a second example, the first element can be at or near the boundary of a fluid passage (e.g., around the boundary of an aperture 141, external end 143, etc.), and the second element can be a sealing element, such as a flap (e.g., wherein bringing the magnets together causes the sealing element to be attached to the boundary of the fluid passage, thereby blocking the fluid passage), such as shown by way of example in FIGS. 7A-7B. However, the magnets can additionally or alternatively be arranged in any other suitable manner.

In a third embodiment, the closure mechanism includes one or more adhesive elements configured to form a seal between multiple elements at or near the location to be sealed (e.g., having analogous placement as described above with respect to the magnetic closure mechanism of the second embodiment). In this embodiment, at least one such element has an adhesive portion (e.g., configured to adhere to another of the elements). In the first configuration, the elements remain apart from each other (e.g., are held apart), and in the second configuration, the elements are brought into contact, thereby forming an adhesive seal that keeps the elements in contact and prevents fluid flow. In variations of this embodiment, the seal can analogously be formed using one or more hook-and-loop fasteners, van der Waals adhesion materials, and/or any other suitable elements with adhesive-like properties.

In a fourth embodiment, the closure mechanism includes one or more expanding elements. The expanding element can be arranged within a fluid passage (e.g., duct, aperture, etc). In the first configuration, the expanding element does not block (or fully block) fluid flow within the passage. For example, the expanding element can be configured in a reduced volume configuration, can be arranged along a duct wall rather than blocking the duct's passage, and/or can otherwise be configured to allow fluid flow past itself. In the second configuration, the expanding mechanism preferably blocks fluid flow within the fluid passage. For example, the mechanism can expand (e.g., inflate) to fill or substantially fill the fluid passage, thereby preventing fluid flow.

However, the closure mechanism 145 can additionally or alternatively include any other suitable fasteners, valve mechanisms, and/or other closure mechanisms.

In some embodiments, the passive vent can include one or more passive check valves. The check valve can function to permit gas flow out of the balloon but not into the balloon. In examples, the check valve can include one or more: ball valves, diaphragm valves, swing valves (e.g., tilting disc valve), reed valves, collapsing-tube valves (e.g., duckbill valve; duct hanging over a support, which can be kept open by gas flow out of the balloon, but is configured to collapse at or around the support when gas is not flowing out of the balloon; etc.). In passive vent embodiments including a check valve and no closure mechanism, the vent may not be operable to control the transition between different configurations (e.g., it may always be possible for gas to vent from the balloon). Additionally or alternatively, the passive vent can include one or more active valves (e.g., controllable between an open state and closed state). In such embodiments, the check valve (and/or active valve), in addition to or in place of a closure mechanism, can be responsible for preventing atmospheric gas ingress into the balloon.

Figure 2A:
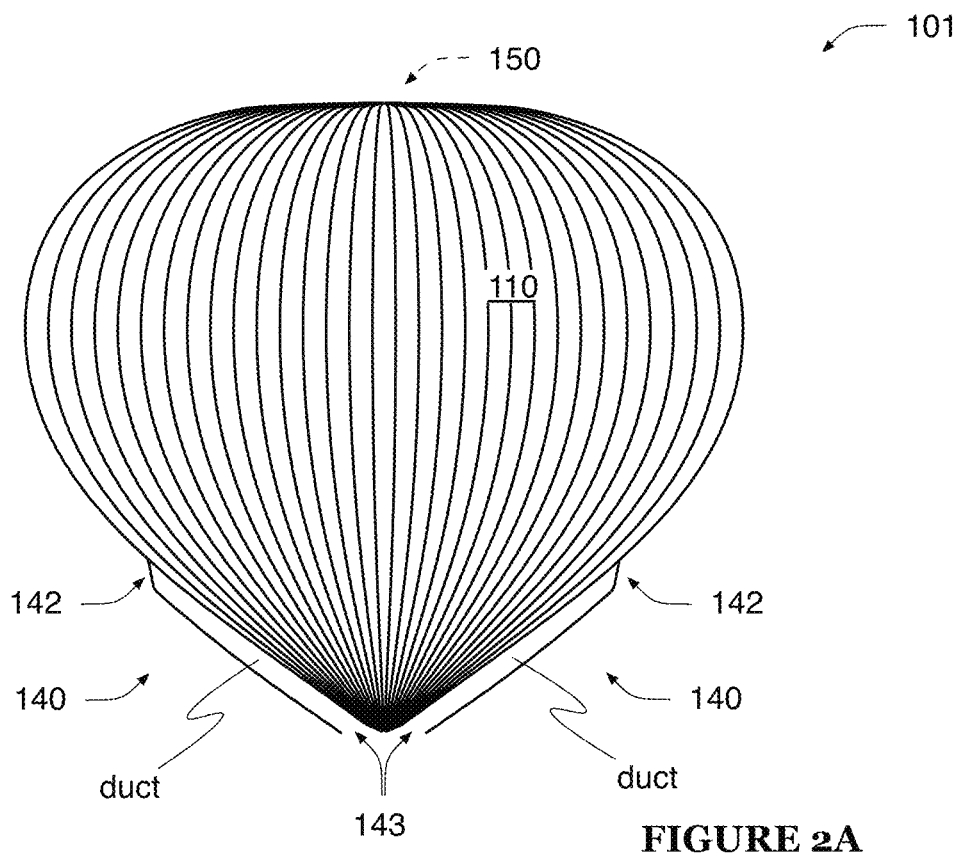
FIGS. 2A-2B are side views of a first and second specific example, respectively, of a balloon of the balloon system.
Figure 2B:
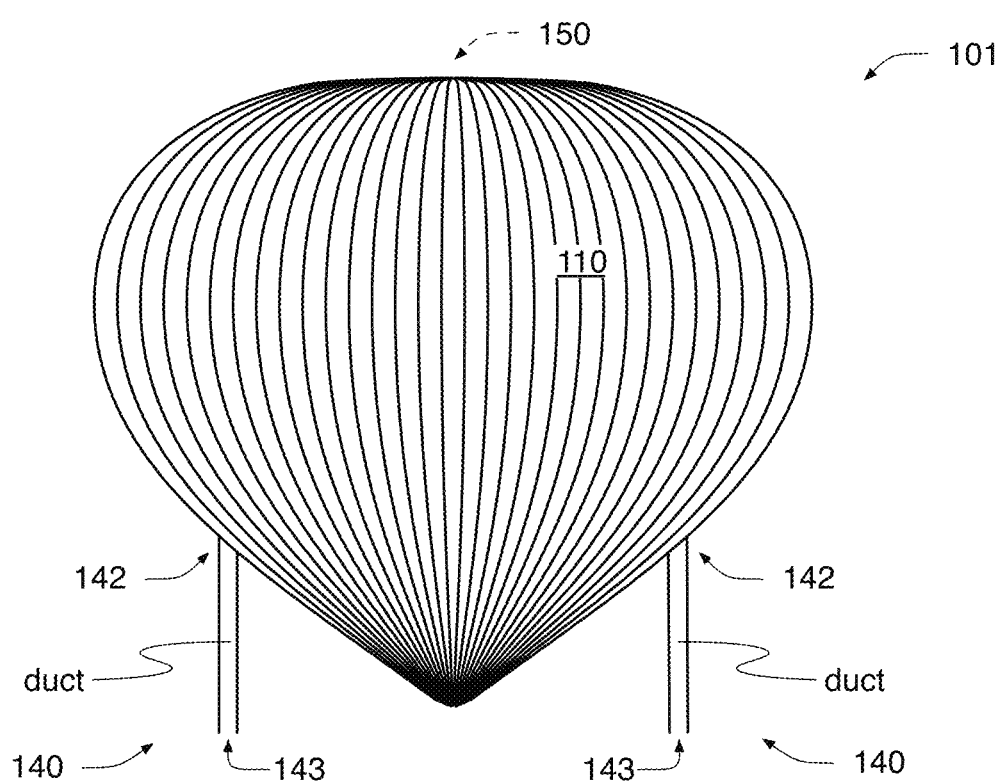
Figure 3A:
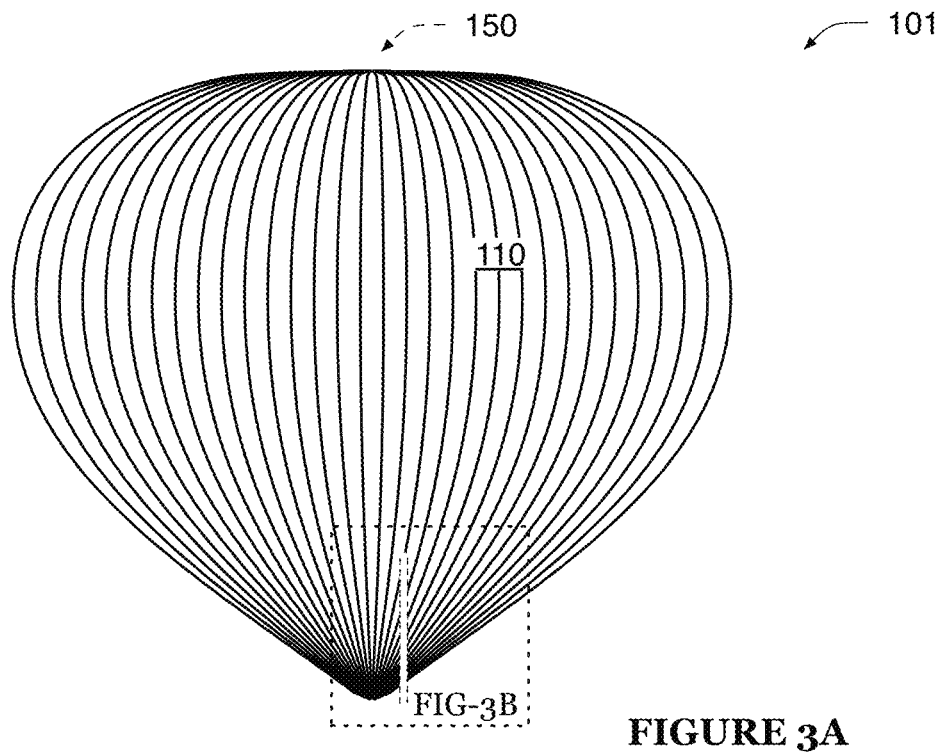
FIG. 3A is a side view of a third specific example of the balloon.
Figure 3B:
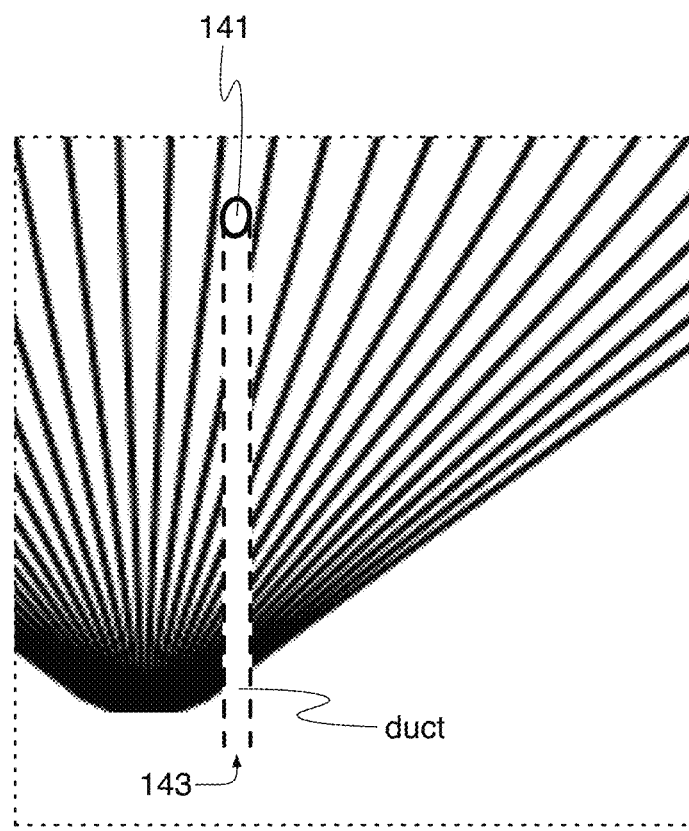
FIG. 3B is a detail view of a portion of FIG. 3A.
Figures 4A, 4B, 4C:
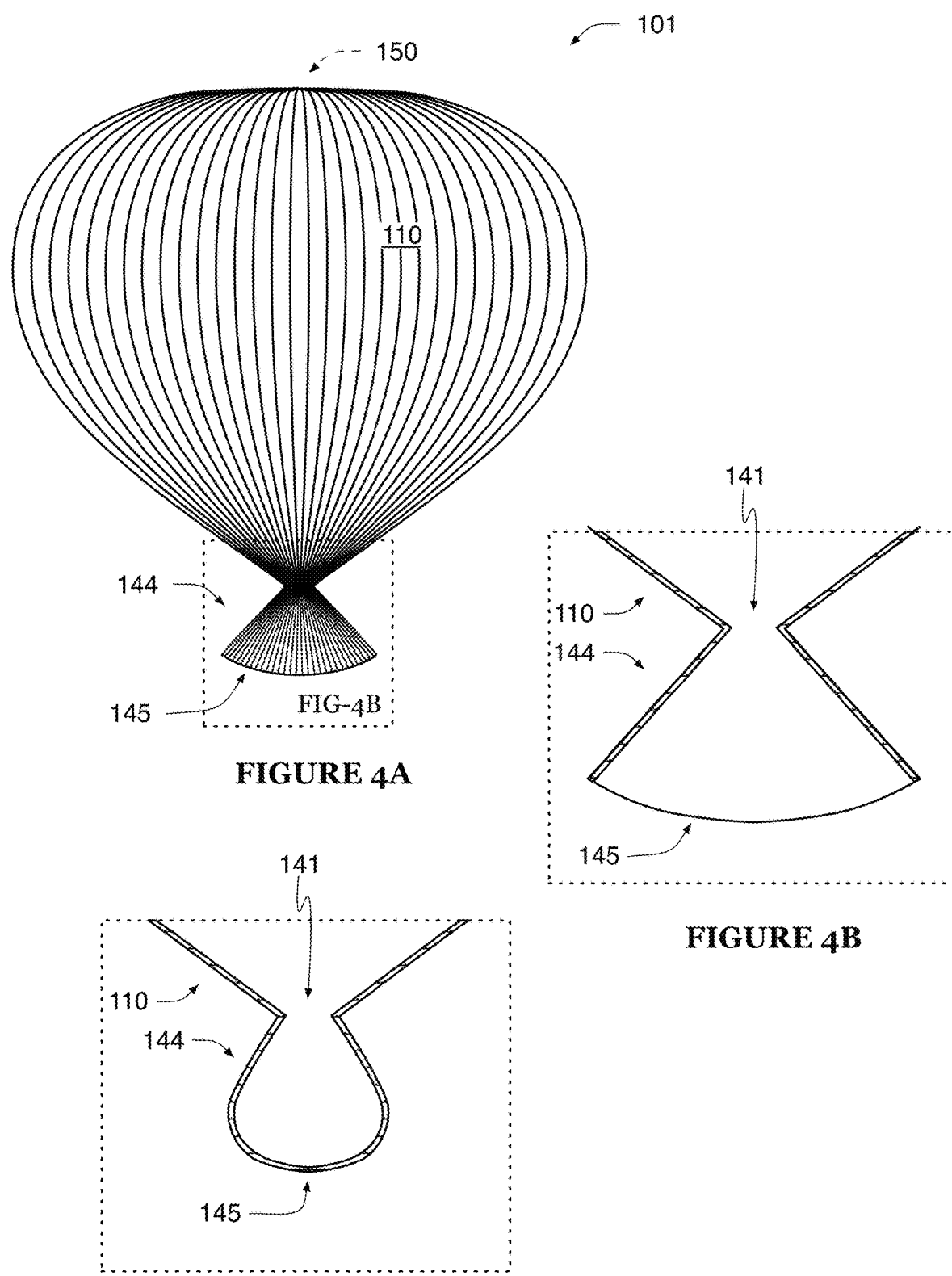
FIG. 4A is a side view of a fourth specific example of the balloon, including a passive vent configured in a first configuration.
FIGS. 4B-4C are cross-sectional detail views of a portion of FIG. 4A, including the passive vent configured in the first configuration and a second configuration, respectively.
Figure 5A:
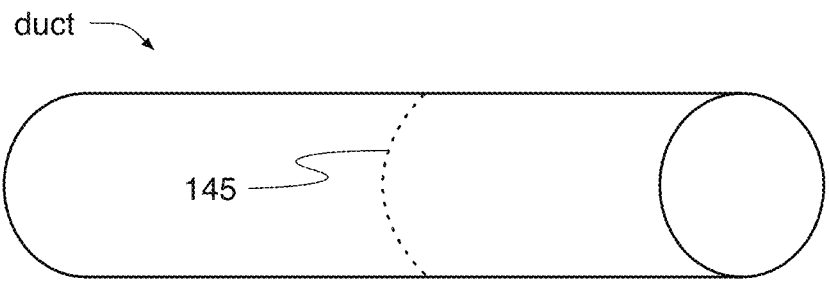
FIGS. 5A-5B are schematic representations of a first example of a closure mechanism of a passive vent in the first configuration and the second configuration, respectively.
Figure 5B:
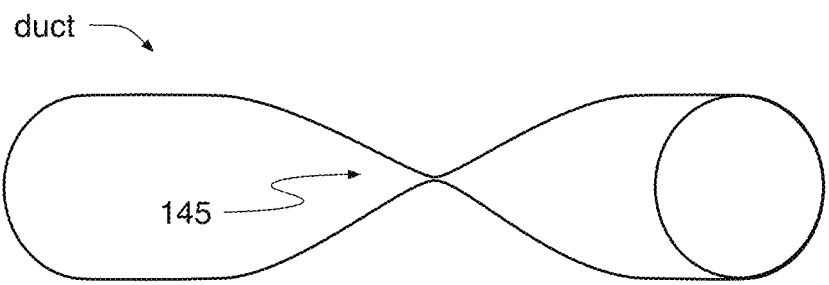
Figure 5C:
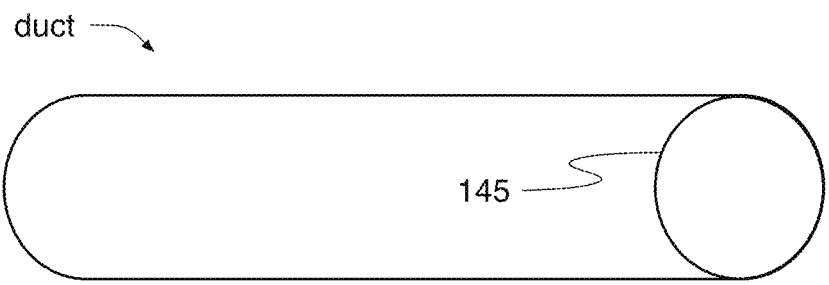
FIGS. 5C-5D are schematic representations of a second example of the closure mechanism in the first configuration and the second configuration, respectively.
Figure 5D:
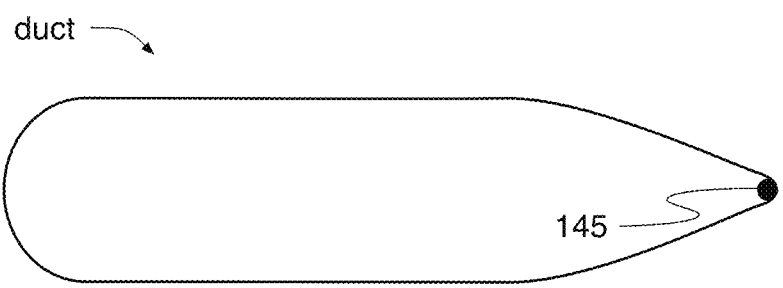

The exit to atmosphere of the passive vent (e.g., the duct external end) is preferably arranged at or near (e.g., just below, just above, substantially at, etc.) the height of the balloon nadir, but can alternatively be arranged substantially below the nadir. In the first configuration, such an arrangement can enable maintenance of a zero-pressure line near the balloon nadir (e.g., substantially at the height of the vent exit). In a first example, the skirt aperture is at the balloon nadir (e.g., as shown in FIG. 4A). In a second example, apertures formed in the balloon envelope gores are present near (e.g., just above) the nadir. In a third example, the duct drops substantially to the height of the nadir (e.g., as shown in FIGS. 2A-2B). The vent exit can alternatively be arranged substantially above the nadir; however, such an arrangement may prevent retention of lift gas at heights below the vent exit, as the vent will typically work toward maintaining the zero-pressure line at the height of the vent exit, and lift gas will typically flow out of the vent until the balloon is no longer substantially inflated below the height of the vent exit. However, the vent can additionally or alternatively have any other suitable arrangement.

In embodiments including vent ducts, the duct balloon end is preferably arranged in a mid-height portion of the balloon, such as approximately halfway up the balloon (e.g., halfway between the nadir and apex), such as within a threshold distance (e.g., less than 5, 10, 15, 20, 25, or 30% of the overall balloon height) of the midpoint. In such arrangements, the aperture in the balloon envelope can be formed near the widest point of the gores, allowing for larger apertures (e.g., substantially circular apertures) contained entirely within a single gore. However, the duct balloon end can alternatively be arranged at any other suitable height, can span multiple gores (such as by integrating the load members into the passive vent at the point where they cross the passive vent), and/or the passive vents can include any other suitable elements in any suitable arrangement.

3.1.3 Active Valve.

The balloon 101 can optionally include one or more active valves 150. The active valve(s) can function to control partial venting of lift gas (e.g., to initiate balloon descent). In some examples, the active valves (and/or other actively-controlled venting elements) can include elements such as described in U.S. Provisional Patent Application 62/969,447, filed 3 Feb. 2020 and titled "Space Capsule", which is herein incorporated in its entirety by this reference (e.g., as described in U.S. Provisional Patent Application 62/969,447 regarding the 'Crown Valve'). The active valve(s) are preferably arranged at or near the balloon apex, but can additionally or alternatively be arranged at any other suitable locations on the balloon. However, the valve(s) can additionally or alternatively have any other suitable arrangement within the balloon, and/or the balloon can include no such valves.

3.1.4 Reefing Sleeve.

Figures 1C, 1D:
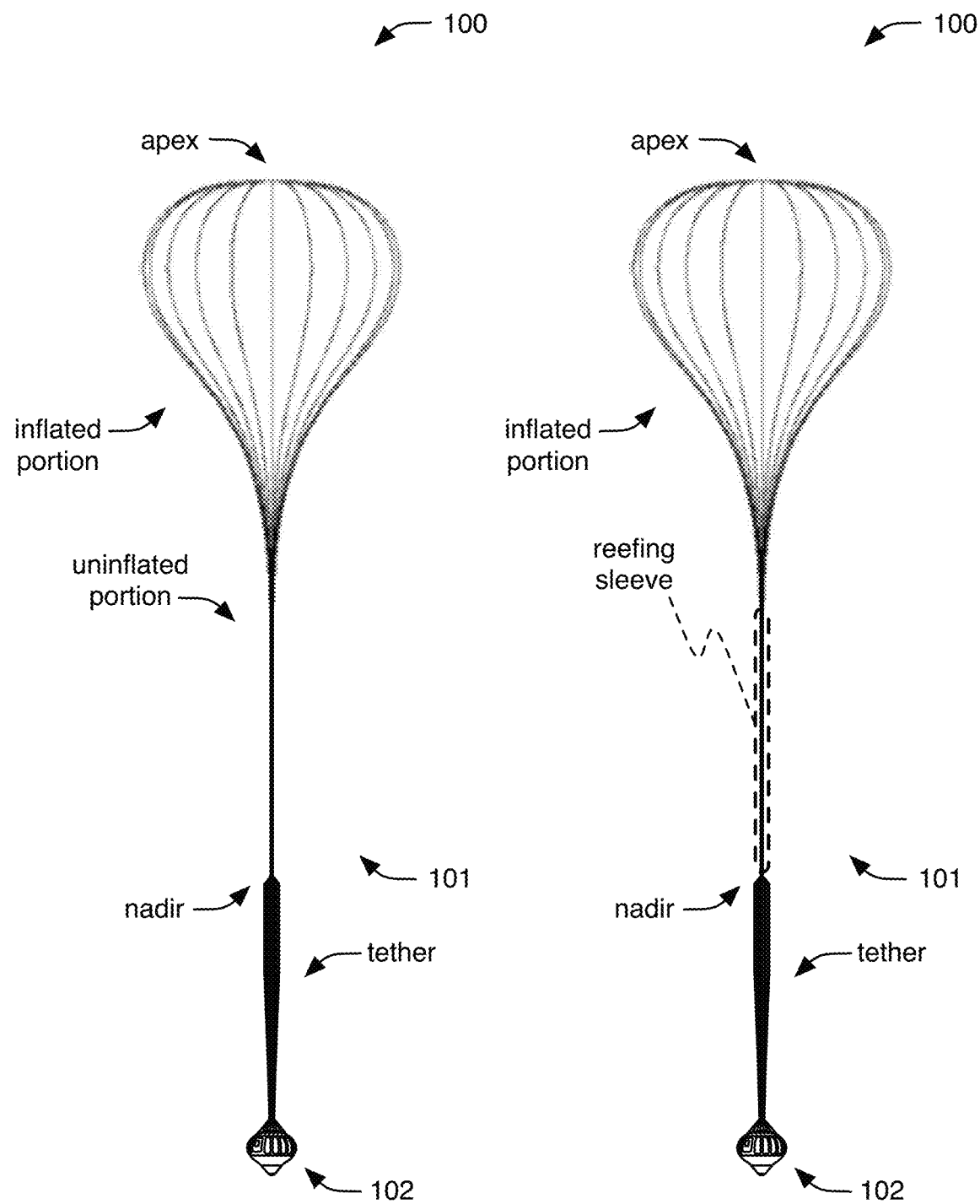
FIGS. 1C-1D are side views of a first and second specific example, respectively, of the balloon system in a partially-inflated state.

The balloon 101 can optionally include one or more reefing sleeves. At low altitudes (e.g., altitudes at which the atmospheric pressure is significantly greater than the pressure in the high-altitude range), the balloon is typically mostly uninflated, with a small inflated volume at the top, and the uninflated portion of the balloon is typically folded and/or twisted up (e.g., as shown in FIGS. 1C-1D). In some examples, the reefing sleeve can function to constrain some or all of this uninflated portion. For example, the reefing sleeve can encircle (e.g., tightly encircle, such as wrapping around) some or all of this uninflated portion (e.g., as shown in FIG. 1D). The reefing sleeve can be released as the balloon inflates (e.g., can be torn open by the force generated from expanding lift gas inflating the balloon, can be controlled to release such as via one or more actuators, etc.).

In some examples (e.g., in which the passive vents are arranged in a lower portion of the balloon, such as in an uninflated portion), the reefing sleeve may additionally or alternatively constrain (e.g., encircle) the passive vents and/or portions thereof (e.g., before the reefing sleeve is released). For example, while constraining the vents, the reefing sleeve may constrict one or more fluid passages defined by the vents, thereby limiting or preventing passage of gas through them (e.g., as described regarding 'Closable balloon vent ducts' and/or the 'reefing sleeve' in U.S. Provisional Patent Application 62/969,447, filed 3 Feb. 2020 and titled "Space Capsule", which is herein incorporated in its entirety by this reference).

However, the balloon 101 can additionally or alternatively include any other suitable elements in any suitable arrangement.

3.2 Payload.

The balloon system can optionally include one or more payloads 102. The payload is preferably mechanically connected to the balloon (e.g., by a tether, rigid mechanical connection, etc.). The payload is preferably connected to the balloon proximal to the balloon nadir, but can additionally or alternatively be connected in any other suitable location. In some examples, this connection can be a releasable connection (e.g., can be operable to transition from a connected configuration to a released configuration in which the mechanical connection between the payload and balloon is disconnected).

The payload 102 preferably includes a capsule (e.g., for containing human passengers), but can additionally or alternatively include any other suitable elements. In examples, the payload 102 can include one or more elements such as described in U.S. Provisional Patent Application 62/969,447, filed 3 Feb. 2020 and titled "Space Capsule", which is herein incorporated in its entirety by this reference (e.g., as described in U.S. Provisional Patent Application 62/969,447 regarding the 'Capsule System').

3.3 Safety Module.

The system can optionally include one or more safety modules 103, such as parachutes, auxiliary propulsion systems (e.g., rockets such as retrorockets, propellers, jet engines, etc.), flight control surfaces (e.g., surfaces, such as fixed and/or rotary wings, including rigid wings, parasail wings, and/or any other suitable wings, rudders, ailerons, and/or elevators, configured to control vehicle flight, such as powered or unpowered descent, in operation as an aerodyne), and/or any other suitable elements. The safety module can function to slow descent of the system (e.g., in circumstances in which the propulsion module is not able to sufficiently slow system descent on its own, in circumstances in which the propulsion module fails and/or is detached from the capsule, etc.), can function to reposition the system (e.g., redirect capsule trajectory to ensure a water landing rather than a terrestrial landing), and/or can function to provide safety (e.g., backup safety) for the system in any other suitable manner. The system can additionally or alternatively include any other suitable elements (e.g., as described in U.S. Provisional Patent Application 62/969,447, filed 3 Feb. 2020 and titled "Space Capsule", which is herein incorporated in its entirety by this reference, such as described regarding the 'Backup Descent System').

However, the balloon system 100 can additionally or alternatively include any other suitable elements in any suitable arrangement.

4. Method.

The method 200 for balloon system operation is preferably performed using the balloon system 100 described above. However, the method 200 can additionally or alternatively be performed using any other suitable systems.

4.1 Ascending.

The method 200 can optionally include ascending S210 (e.g., controlling the balloon system to ascend). S210 can include ascending to a high altitude range. This ascent is made from a lower altitude range, preferably a tropospheric altitude range, such as at or near the Earth's surface. In the low altitude range, the balloon is preferably partially inflated with the lighter-than-air fluid (e.g., wherein higher atmospheric pressures in this low altitude range prevent expansion of the lighter-than-air fluid to fully or substantially fully inflate the balloon). However, the balloon system can additionally or alternatively ascend from any other suitable altitude. In examples, this low altitude range can be less than 0, 0.1, 0.2, 0.5, 1, 2, 5, 7, 10, 15, 20, 25, or 30 km above sea level, (e.g., at or substantially at ground level, such as near sea level or ground level at the site at which the balloon system launches and/or lands), but can alternatively be in any other suitable altitude range.

The high altitude range is preferably a stratospheric altitude range. In examples, the high altitude range can be more than 1, 2, 5, 7, 10, 15, 20, 25, 30, 35, 40, or 50 km above sea level (e.g., above 30 km or 100,000 ft), but can alternatively be in any other suitable altitude range. The balloon preferably inflates during ascent (e.g., due to the reduction in atmospheric air pressure during ascent), and preferably reaches a fully or substantially fully inflated state at the high altitude range (e.g., wherein the balloon remains substantially fully inflated while remaining in the high altitude range). In examples, the balloon volume ratio (e.g., balloon volume at low altitude divided by volume of the fully-inflated balloon) can be less than 1%, 2%, 3%, 5%, 10%, 15%, 20%, 30%, 0.1-1%, 1-2%, 2-5%, 5-10%, 10-20%, 20-30%, 30-50%, or greater than 50%.

At low altitudes (e.g., altitudes at which the atmospheric pressure is significantly greater than the pressure in the high-altitude range), the balloon is mostly uninflated, with a small inflated volume at the top, and the uninflated portion of the balloon is typically folded and/or twisted up (e.g., as shown in FIGS. 1C-1D). In some examples, the balloon includes a reefing sleeve that encircles some or all of this uninflated portion (e.g., as shown in FIG. 1D, as described above in more detail, etc.). The reefing sleeve is preferably released (e.g., automatically by the force of expanding lift gas inflating the balloon) during the ascent, but can additionally or alternatively be released with any other suitable timing (and/or can be retained throughout performance of the method).

In a first embodiment, during the ascent, the passive vent is in the first configuration. In this embodiment, the vent may be open, thereby fluidly coupling the portion of the balloon interior adjacent the vent to a portion of the balloon exterior adjacent the vent. However, at sufficiently low altitudes (e.g., in which this portion of the balloon is uninflated and/or contained within a reefing sleeve), fluid transfer between the balloon and atmosphere may be limited and/or prevented. If the vent is arranged in the lower (uninflated) portion of the balloon, the vent will typically be sealed or restricted (e.g., because the balloon is twisted and/or folded up, because the reefing sleeve holds the vents closed, etc.). The reefing sleeve can be a sleeve encircling the uninflated lower portion of the balloon (and the passive vents or portions thereof, such as a portion of the vent duct). Additionally or alternatively, the negative-pressure condition in the balloon may prevent the vent from fluidly coupling the balloon interior to the balloon exterior (e.g., by maintaining a passive check valve in a closed state, by collapsing or preventing the opening of a vent structure such as a duct, etc.). However, the partially inflated balloon can alternatively be configured in any other suitable manner.

In a second embodiment, the passive vent is configured in a closed state (e.g., the second configuration) during all or part of the ascent (e.g., to be opened at higher altitudes, such as in the high-altitude range). In this embodiment, the passive vent is preferably operable to transition to the first configuration (e.g., from the second configuration, or from a different configuration in which the passive vent is sealed). In this embodiment, the passive vent can be kept closed during the ascent, and then the vent can be opened (e.g., transitioned to the first configuration) at higher altitude. This transition can occur within the high-altitude range, or during a later portion of ascent to the high-altitude range (e.g., above a threshold relative balloon pressure, such as once a negative-pressure condition does not exist in the balloon, does not exist at the vent aperture, or does not exist throughout the vent, or once a positive-pressure condition does exist in the balloon; above a threshold altitude, such as an altitude at which atmospheric conditions transition from those in which mixing the atmospheric gases with the lift gas can pose an explosion risk to those in which it cannot). In examples, the transition can occur at more than 0.1, 0.2, 0.5, 1, 2, 5, 7, 10, 15, 20, 25, 30, 35, 40, or 50 km above sea level (e.g., above 30 km or 100,000 ft), but can alternatively be at any other suitable altitude. However, the passive vent can additionally or alternatively be configured in any other suitable manner during ascent.

4.2 Maintaining a Zero Pressure Balloon Condition.

Maintaining a zero-pressure balloon condition S220 preferably functions to prevent any substantial pressure differential (e.g., positive pressure) from forming within the balloon interior, as a substantial positive pressure within the balloon could pose a risk of rupturing the balloon. S220 is preferably performed while in the high-altitude range, such as while maintaining the balloon in the high-altitude range (e.g., substantially maintaining altitude within the high-altitude range). S220 is preferably performed during all or substantially all of the time spent residing in the high-altitude range, but can additionally or alternatively be performed at any other suitable times. In examples, the balloon can remain in the high-altitude range for a time period of minutes, hours, days, or longer. In one example, the balloon remains in the high-altitude range between 1 and 10 hours (e.g., 2-6 hours), such as entirely or partially during the daytime. However, the balloon can remain in the high-altitude range and/or be maintained in the zero-pressure condition for any other suitable period of time.

During flight of a typical zero-pressure balloon, the balloon becomes more inflated as it ascends; once the balloon is fully inflated, it will typically vent excess lift gas (the free lift) in order to maintain a substantially zero-pressure condition. After venting the free lift, the balloon typically remains substantially fully inflated while maintaining altitude in a high-altitude range. During this time, the lift gas may increase and/or decrease in temperature. As the lift gas heats (e.g., due to solar irradiation, such as during the day), the lift gas expands which can cause the balloon to become slightly more inflated, thereby resulting in an altitude increase. In response to the gas expansion, some gas can vent from the balloon (e.g., through one or more passive vents, such as vent ducts in the balloon). This venting preferably occurs rather than having the gas expansion result in a substantial positive pressure within the balloon (e.g., which could occur once the balloon is completely inflated, in the absence of sufficient passive venting). As the lift gas cools (e.g., due to a reduction in or the absence of solar irradiation, such as during the night), the lift gas contracts and the balloon becomes slightly less inflated, thereby typically resulting in an altitude decrease (which can be compensated for by releasing ballast).

Accordingly, S220 preferably includes maintaining one or more passive vents in the first configuration, thereby enabling passive venting of lift gas (e.g., venting of the free lift near the end of the ascent and/or beginning of altitude maintenance, venting of heated lift gas during altitude maintenance, etc.). If a passive vent is not in the first configuration (e.g., if ascending S210 is performed with the vents in the second configuration or some other closed configuration), then S220 preferably includes transitioning the vents to the first configuration (e.g., opening and/or unsealing the vents); without such a transition, the balloon may enter a substantially over-pressure state, which can pose a risk of balloon rupture.

However, S220 can additionally or alternatively include maintaining the zero-pressure balloon condition in any other suitable manner.

4.3 Sealing Balloon Vents.

Sealing balloon vents S230 preferably functions to prevent atmospheric gas ingress into the balloon interior, as a mixture of atmospheric oxygen with a hydrogen lift gas could pose an explosion risk. S230 is preferably performed for embodiments of passive vents that include a closure mechanism (in passive vent embodiments including only a check valve, the vents are automatically sealed against atmospheric gas ingress by the check valve, and do not include a closure mechanism that can be used to actively seal the vents). S230 preferably includes closing and/or sealing all passive vents of the balloon, transitioning each passive vent to the second configuration (e.g., from the first configuration), but can alternatively be performed only for a subset of such vents. This transition can be controlled (e.g., effected) as described above regarding the passive vents S140 and/or in any other suitable manner.

S230 is preferably performed once the risk of balloon overpressure (in the absence of passive venting) no longer exists (or once this risk is sufficiently low). In examples, this could be once the balloon is no longer fully inflated and is not expected to become fully inflated, and/or once the lift gas is not expanding (and is not expected to expand further). Alternatively, S230 can be performed before these conditions are strictly met, such as when a substantial positive pressure condition is unlikely to arise (e.g., the balloon may become fully inflated, but only minimal positive pressure is expected to exist; lift gas may be expanding or expected to expand in the future, but is expected not to expand sufficiently to fully inflate the balloon or create a substantial positive pressure; etc.).

S230 is preferably performed in temporal proximity to initiation of descent (e.g., as described below in more detail). For example, the balloon vents can be sealed just before, just after, and/or substantially concurrent with initiation of descent (e.g., within a threshold time of descent initiation, such as within 1, 2, 5, 10, 20, 30, or 60 minutes, etc.).

In a first embodiment, S230 is performed substantially concurrent with the beginning of descent. A positive rate of descent can be indicative that the balloon is not fully inflated (e.g., a negative-pressure condition exists within part or all of the balloon), and so the balloon vents are preferably sealed at this time to prevent air ingestion. In an alternate variation of this embodiment, S230 can be performed after descent has begun, but before the balloon has descended to an altitude with atmospheric pressure high enough to pose a potential explosion risk (e.g., a mixture of hydrogen with the atmosphere under the present conditions would not form an explosive gas). In this embodiment, the lift gas will compress into a smaller volume during descent, and so the risk of overpressure within the balloon after vent closure is typically minimized or eliminated.

In a second embodiment, S230 is performed at a time when the lift gas temperature is dropping and is not anticipated to rise before balloon descent is initiated. For example, S230 can be performed after the sun has set, such as in situations in which the descent will be initiated before sunrise. In this embodiment, the lift gas is not expected to expand (e.g., will lose volume as it cools), and will later be subject to higher atmospheric pressures at lower altitudes once descent begins, and so the risk of establishing an overpressure condition in the balloon after vent closure is reduced or eliminated.

S230 can alternatively be performed at any other suitable time before the risk of substantial air or oxygen intake arises. For example, S230 can be performed while the balloon is still in a region with low atmospheric pressure, such that the atmospheric oxygen concentration is insignificant (e.g., and so sufficient oxygen to pose a hydrogen explosion risk is unlikely to enter the balloon interior) and/or such that the balloon is still mostly inflated (e.g., and thus, a large negative pressure has not been established within the balloon interior). This maybe within the same altitude range described above at which the passive vents may become open (e.g., due to release of the reefing sleeve, due to transition of the vents to the first configuration, etc.), at a higher altitude range, at a lower altitude range, and/or at any other suitable altitude.

However, S230 can additionally or alternatively be performed with any other suitable timing and/or can include sealing the balloon vents in any other suitable manner.

4.4 Descending.

The method preferably includes descending S240 (e.g., descending from the high altitude range). The descent is preferably made to a tropospheric altitude range (e.g., less than 0, 0.1, 0.2, 0.5, 1, 2, 5, 7, 10, 15, or 20 km above sea level), such as to or near the Earth's surface, but can alternatively be made to a lower stratospheric altitude (e.g., less than 7, 10, 15, 20, 25, 30, 35, 40, or 50 km above sea level) or to any other suitable altitude. For example, the descent can be made in preparation for landing the balloon system. During descent, a majority of the lighter-than-air fluid is preferably retained within the balloon. Despite this retention, the balloon will typically partially deflate during the descent, due to the increase in atmospheric air pressure.

S240 preferably includes initiating the descent. The descent is preferably initiated by actively controlling the balloon to vent additional lift gas (e.g., additional to the lift gas that is passively vented through the passive vents). The additional lift gas is preferably vented from any location at or near the balloon apex. For example, S240 can include controlling a valve arranged at or near the apex to open, thereby allowing lift gas to vent through it.

As described above, S230 can be performed after initiating descent (e.g., once the rate of descent is greater than the threshold velocity, such as 0, 0.1, 0.2, 0.5, 1, 2, or 3 meters/second, etc.). However, S230 and S240 can additionally or alternatively be performed with any other suitable timing (with respect to each other and/or any other suitable events).

4.5 Additional Balloon Operations.

The method 200 can optionally include one or more elements such as described in U.S. Provisional Patent Application 62/969,447, filed 3 Feb. 2020 and titled "Space Capsule", and/or in U.S. patent application Ser. No. 17/162,151, filed 29 Jan. 2021 and titled "Aerospace Balloon System and Method of Operation", each of which is herein incorporated in its entirety by this reference. For example, the method can include one or more elements described in U.S. patent application Ser. No. 17/162,151 regarding the method described therein (e.g., regarding 'operating the balloon system in flight', 'landing the balloon system', and/or 'deflating the balloon'), and/or one or more elements described in U.S. Provisional Patent Application 62/969,447 regarding balloon system operation (e.g., as described regarding 'Launch and Recovery' and/or 'Buoyancy control'). However, the method 200 can additionally or alternatively include performing any other suitable balloon system flight operations, and/or can include any other suitable elements performed in any suitable manner.

An alternative embodiment preferably implements the some or all of above methods in a computer-readable medium storing computer-readable instructions. The instructions are preferably executed by computer-executable components preferably integrated with a communication routing system. The communication routing system may include a communication system, routing system and a pricing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The FIGS. illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGS.. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

I claim:

1. A system comprising:
   a balloon comprising a surface, the balloon defining: a balloon apex, a balloon interior within the surface, and a balloon exterior outside the surface;
   a first valve arranged proximal to the balloon apex at the surface, the first valve operable to controllably fluidly couple the balloon interior to the balloon exterior;
   a passive vent arranged at the surface of the balloon, the passive vent operable to passively transition from a first configuration to a second configuration, wherein:
      in the first configuration, the balloon interior is fluidly coupled to the balloon exterior via the passive vent and the passive vent is configured to passively maintain a substantially zero-pressure condition within the balloon; and
      in the second configuration, the passive vent is substantially sealed.

2. The system of claim 1, wherein the first valve is configured to initiate descent of the balloon system by opening, thereby venting lighter-than-air fluid via the first valve.

3. The system of claim 2, wherein the lighter-than-air fluid comprises molecular hydrogen.

4. The system of claim 2, wherein the passive vent is configured to passively transition to the second configuration after the active valve initiates descent of the system.

5. The system of Claim 4, wherein the passive vent is configured to passively transition to the second configuration within a predetermined altitude range, wherein the altitude range is predetermined based on an atmospheric oxygen concentration.

6. The system of claim 1, wherein the first valve comprises at least one of: an apex fitting or a crown valve.

7. The system of claim 1, wherein the passive vent comprises a vent duct.

8. A system comprising:
   a zero-pressure balloon comprising:
      an envelope which defines an aperture; and
      a reefing sleeve; and
   a passive check valve coupled to the aperture and arranged proximal to a nadir portion of the envelope, the passive check valve configurable between:
      a first configuration, in which the passive check valve is wrapped within the reefing sleeve and sealed by the reefing sleeve; and
      a second configuration, in which the passive check valve passively restricts gas flow through the aperture to be substantially unidirectional out of the zero-pressure balloon.

9. The system of claim 8, further comprising an apex valve comprising an actuator at an apex portion of the envelope.

10. The system of Claim 9, wherein the apex valve is configured to actively control descent of the zero-pressure balloon by selectively venting a lift gas from the envelope.

11. system of claim 8, wherein the reefing sleeve is configured to release during ascent of the zero-pressure balloon under force of an expanding lift gas within the envelope, wherein release of the reefing sleeve transitions the passive check valve from the first configuration to the second configuration.

12. The system of Claim ii, wherein the reefing sleeve is configured to passively releases by tearing in response to the force of the expanding lift gas.

13. The system of claim 8, wherein the zero-pressure balloon is configured to transition the passive check valve from the first configuration to the second configuration based on a volume of the envelope.

14. The system of claim 8, wherein the zero-pressure balloon is configured to passively restrict gas flow through the aperture based on an atmospheric pressure of an ambient environment surrounding the zero-pressure balloon.

15. The system of claim 8, wherein, in the second configuration, the passive check valve passively maintains a substantially zero pressure condition within the zero-pressure balloon.

16. A system comprising:
a balloon envelope configured to contain a lift gas;
a first valve arranged proximal to an apex of the balloon envelope, the first valve comprising an actuator;
a passive check valve coupled to the balloon envelope and arranged proximal to a nadir portion of the balloon envelope, the passive check valve configured to vent the lift gas to maintain a substantially zero pressure condition within the balloon envelope and configured to substantially prevent ingress of atmospheric gas into the balloon envelope.

17. The system of claim 16, the passive check valve comprises a duct which is integrated into the balloon envelope.

18. The system of claim 17, wherein, in a first configuration, the nadir portion of the balloon envelope is underinflated, wherein, in the first configuration, the passive check valve is sealed by a fold of the balloon envelope.

19. The system of claim 18, wherein the fold is within the duct.

20. The system of claim 17, wherein, in a first configuration, the nadir portion of the balloon envelope is underinflated, wherein the duct is collapsed due to underinflation of the nadir portion, thereby preventing gas flow through the passive check valve.

21. The system of claim 16, wherein the passive check valve is configured to maintain the substantially zero pressure condition during a first period of a balloon trip, wherein the passive check valve passively closes after the first period of the balloon trip.

22. The system of claim 16, wherein the passive check valve substantially prevents ingress of atmospheric gas into the balloon envelope below an altitude threshold, wherein the altitude threshold is based on at least one of: an atmospheric oxygen concentration or an atmospheric pressure.

* * * * *

UNITED STATES PATENT AND TRADEMARK OFFICE
CERTIFICATE OF CORRECTION

| | |
|---|---|
| PATENT NO. | : 11,753,136 B2 |
| APPLICATION NO. | : 18/084410 |
| DATED | : September 12, 2023 |
| INVENTOR(S) | : Taber MacCallum |

It is certified that error appears in the above-identified patent and that said Letters Patent is hereby corrected as shown below:

In the Claims

Column 14, Line 33, In Claim 5, delete "Claim" and insert --claim-- therefor

Column 14, Line 59, In Claim 10, delete "Claim" and insert --claim-- therefor

Column 14, Line 62, In Claim 11, before "system", insert --The--

Column 15, Line 1, In Claim 12, delete "Claim" and insert --claim-- therefor

Column 15, Line 1, In Claim 12, delete "ii," and insert --11,-- therefor

Signed and Sealed this
Thirty-first Day of October, 2023

*Katherine Kelly Vidal*
Katherine Kelly Vidal
*Director of the United States Patent and Trademark Office*